US011305316B2

(12) United States Patent
Mumm et al.

(10) Patent No.: US 11,305,316 B2
(45) Date of Patent: Apr. 19, 2022

(54) METHOD AND APPARATUS FOR SUPPLYING SUPPORT FROM BELOW TO A SCREEN CLOTH ON A VIBRATING SCREENING MACHINE

(71) Applicant: Terex USA, LLC, Westport, CT (US)

(72) Inventors: Ryan Anthony Mumm, Newhall, IA (US); Alexander Evan Ross, Washington, IA (US); Michael Peter Stemper, Marion, IA (US); Nicholas Samuel Grady, Cedar Rapids, IA (US); Josh Edward Ellis, Shepherd, MI (US); David Bryan Stroup, Burt, MI (US)

(73) Assignee: Terex USA, LLC, Westport, CT (US)

( * ) Notice: Subject to any disclaimer, the term of this patent is extended or adjusted under 35 U.S.C. 154(b) by 231 days.

(21) Appl. No.: 16/598,259

(22) Filed: Oct. 10, 2019

(65) Prior Publication Data
US 2020/0055089 A1    Feb. 20, 2020

Related U.S. Application Data

(63) Continuation-in-part of application No. 16/003,255, filed on Jun. 8, 2018, now Pat. No. 10,471,472.

(60) Provisional application No. 62/744,314, filed on Oct. 11, 2018, provisional application No. 62/516,946, filed on Jun. 8, 2017.

(51) Int. Cl.
*B07B 1/46* (2006.01)
*B01D 33/03* (2006.01)

(52) U.S. Cl.
CPC ........ *B07B 1/4645* (2013.01); *B01D 33/0376* (2013.01)

(58) Field of Classification Search
CPC ...... B07B 1/46; B07B 1/4645; B01D 33/0376
USPC ........................................................ 209/412
See application file for complete search history.

(56) References Cited

U.S. PATENT DOCUMENTS

| 3,255,885 | A | * | 6/1966 | Burls | B07B 1/4672 |
| | | | | | 209/314 |
| 4,840,728 | A | * | 6/1989 | Connolly | B07B 1/46 |
| | | | | | 209/397 |
| 6,866,452 | B2 | * | 3/2005 | Khattab | B61D 45/007 |
| | | | | | 410/69 |
| 2002/0088531 | A1 | * | 7/2002 | Cook | B29C 70/56 |
| | | | | | 156/160 |

(Continued)

FOREIGN PATENT DOCUMENTS

| CA | 3058607 | A1 | * | 4/2020 |
| GB | 190327399 | A | * | 12/1904 |

*Primary Examiner* — Terrell H Matthews
(74) *Attorney, Agent, or Firm* — Simmons Perrine Moyer Bergman PLC (57) ABSTRACT

A support structure for vibrating screening machine with either a flat screen deck or a crowned screen deck which use a coped and then capped variation of the same prefabricated rectangular tubular cross-member but in rotated orientations. The machine further providing support for a crowned screen media without using a crowned cross-member by providing stringers with differing vertical heights with the centermost stringer having the most height above a flat top cross-member. A plurality of crown straps coupled to a top surface of a cross-member, where the crown straps have a C-shaped portion at one end which has a portion thereof coupled to a top surface of a cross-member.

18 Claims, 11 Drawing Sheets

(56) References Cited

U.S. PATENT DOCUMENTS

| | | | |
|---|---|---|---|
| 2002/0195377 A1* | 12/2002 | Trench | B07B 1/4645 |
| | | | 209/365.1 |
| 2015/0239014 A1* | 8/2015 | Lipa | B07B 1/4609 |
| | | | 209/392 |
| 2016/0207069 A1 | 7/2016 | Pomerleau | |

* cited by examiner

METHOD AND APPARATUS FOR SUPPLYING SUPPORT FROM BELOW TO A SCREEN CLOTH ON A VIBRATING SCREENING MACHINE

CROSS REFERENCE TO RELATED APPLICATIONS

The present application claims the benefit of the filing date of provisional patent application having Ser. No. 62/744,314 filed on Oct. 11, 2018 by the following inventors: Ryan Anthony Mumm, Josh Edward Ellis and David Bryan Stroup;

which present application is a continuation-in-part of the non-provisional application having Ser. No. 16/003,255 filed on Jun. 8, 2018 by the following inventors: Ryan Anthony Mumm, Alexander Evan Ross, Michael Peter Stemper and Nicholas Samuel Grady;

which non-provisional application claims the benefit of the filing date of the provisional patent application having Ser. No. 62/516,946 filed on Jun. 8, 2017 by the following inventors: Ryan Anthony Mumm, Alexander Evan Ross, Michael Peter Stemper and Nicholas Samuel Grady;

All such applications are hereby incorporated herein, in their entireties by these references.

FIELD OF THE INVENTION

The present invention generally relates to material processing, and more particularly relates to vibrating screening machines, and, even more particularly, relates to support structure below screen cloths or wire cloths on vibrating screening machines.

BACKGROUND OF THE INVENTION

In the past, various support structures below screening media or screen cloths have been used in a wide variety of applications.

A common deck design, of the past, has used a fabricated I-beam cross-member that tapers down toward the ends. The ends were typically welded into a formed plate that makes the deck sides. The tapered ends of the fabricated I-beam allow use of shortened height deck sides, which is desirable. This design can be used with either side tension style decks or with urethane media style decks, depending on which way the I-beam cross-member is oriented.

Another common design has been to use a straight tube design. Such designs often are symmetrical and can be used with either side tension style decks or with urethane media style decks. These designs have often been relatively inexpensive.

While these types of support structure systems may have many advantages in particular applications, they also have some drawbacks. For example, with the fabricated I-beam approach some challenges are presented. Firstly, fabricating a tapered I-beam is costly. Secondly, welding around the I-beam ends causes stress concentrations due to the non-continuous welds and due to the geometry of the I-beam cross section. These stress concentrations fatigue with the cyclic loading of the screen, causing cracks to develop and the screen deck can begin to fail. With the straight tube design, it often forces designers to scale upwardly the deck sides with deck width. Eventually, the deck sides become too tall to be feasible for use, especially if it is often necessary to transport the screens on public highways between job sites, where height restrictions will apply to all vehicles.

Consequently, there exists a need for improved methods and apparatuses for efficiently supporting a screen cloth in vibrating screen machines.

SUMMARY OF THE INVENTION

It is an object of the present invention to provide an easily implemented system for supporting a screen cloth.

It is a feature of the present invention to utilize a flat centered tubular cross-member with tapered ends spanned by longitudinal stringers with differential height characteristics.

It is an advantage of the present invention to provide for some of the benefits of tapered I-beams at a much reduced cost.

It is another object of the present invention to provide an easily implemented method of tapering portions of a tubular cross-member.

It is another feature of the present invention to cope and cap ends of a tubular cross-member.

It is another advantage of the present invention to provide for a method of making a tapered tubular cross-member and for coupling the same to sides of a vibrating screen machine.

It is yet another object of the present invention to reduce cracking of decks of vibrating screening machines.

There are still additional features of the present invention which utilize novel crown straps and methods of coupling the same to structural portions of decks of vibrating screening machines.

There are still additional advantages of the present invention such as to extend time periods before a first failure of crown straps, decks, and other structures for supporting wire cloth on a vibrating screening machine.

The present invention is an apparatus and method for efficiently and cost effectively providing support from below for a screen cloth or screen media, which apparatus and method are designed to satisfy the aforementioned needs, provide the previously stated objects, include the above-listed features, and achieve the already articulated advantages.

Accordingly, the present invention is a method of improving the manner of making a material processing vibrating screening machine, comprising the steps of:

providing a pair of spaced apart parallel longitudinal side members;

providing a plurality of cross-members having opposing ends, each of which are coupled to one of said pair of spaced apart parallel longitudinal side members;

where each of said plurality of cross-members is made through a process of:

creating a hollow tube;

removing corner portions of said hollow tube, and thereby creating newly exposed surfaces;

creating a plurality of cap plates configured to be mated to said newly exposed surfaces;

replacing each of said corner portions with one of said plurality of cap plates; and securing a screen media above said plurality of cross-members, which screen media is configured to only allow particles having smaller size than a predetermined size to pass therethrough.

Additionally, the present invention is a system for improving the cost of crowned screen cloths in a material processing vibrating screening machine comprising:

a pair of spaced apart parallel longitudinal side members;
a plurality of cross-members having opposing ends, each of which are coupled to one of said pair of spaced apart parallel longitudinal side members;
where each of said plurality of cross-members include sloped end portions, each of which is defined by a cap plate disposed thereon; and
a screen media secured above said plurality of cross-members, which screen media is configured to only allow particles having smaller size than a predetermined size to pass therethrough.

Still further, the present invention is a system for improving the operating costs of crowned screen cloths in a material processing vibrating screening machine comprising:
a pair of spaced apart parallel longitudinal side members;
a plurality of cross-members having opposing ends, each of which are coupled to one of said pair of spaced apart parallel longitudinal side members; and
a screen media disposed above said plurality of cross-members, and separated therefrom by a plurality of crown straps, spanning a space between said pair of spaced apart parallel longitudinal side members; where each of said plurality of crown straps does not entirely span the space and have each an end of the crown strap disposed near one of the parallel longitudinal side members.

BRIEF DESCRIPTION OF THE DRAWINGS

The invention may be more fully understood by reading the following description of the preferred embodiments of the invention, in conjunction with the appended drawings wherein.

DETAILED DESCRIPTION

Although described with particular reference to inclined multi-level vibrating screens, the systems and methods of the present invention for supporting a screen cloth can be implemented in many different types of vibrating screen applications.

In one embodiment, the system and method of the present invention described herein can be viewed as examples of many potential variations of the present invention which are protected hereunder.

Figure 1:
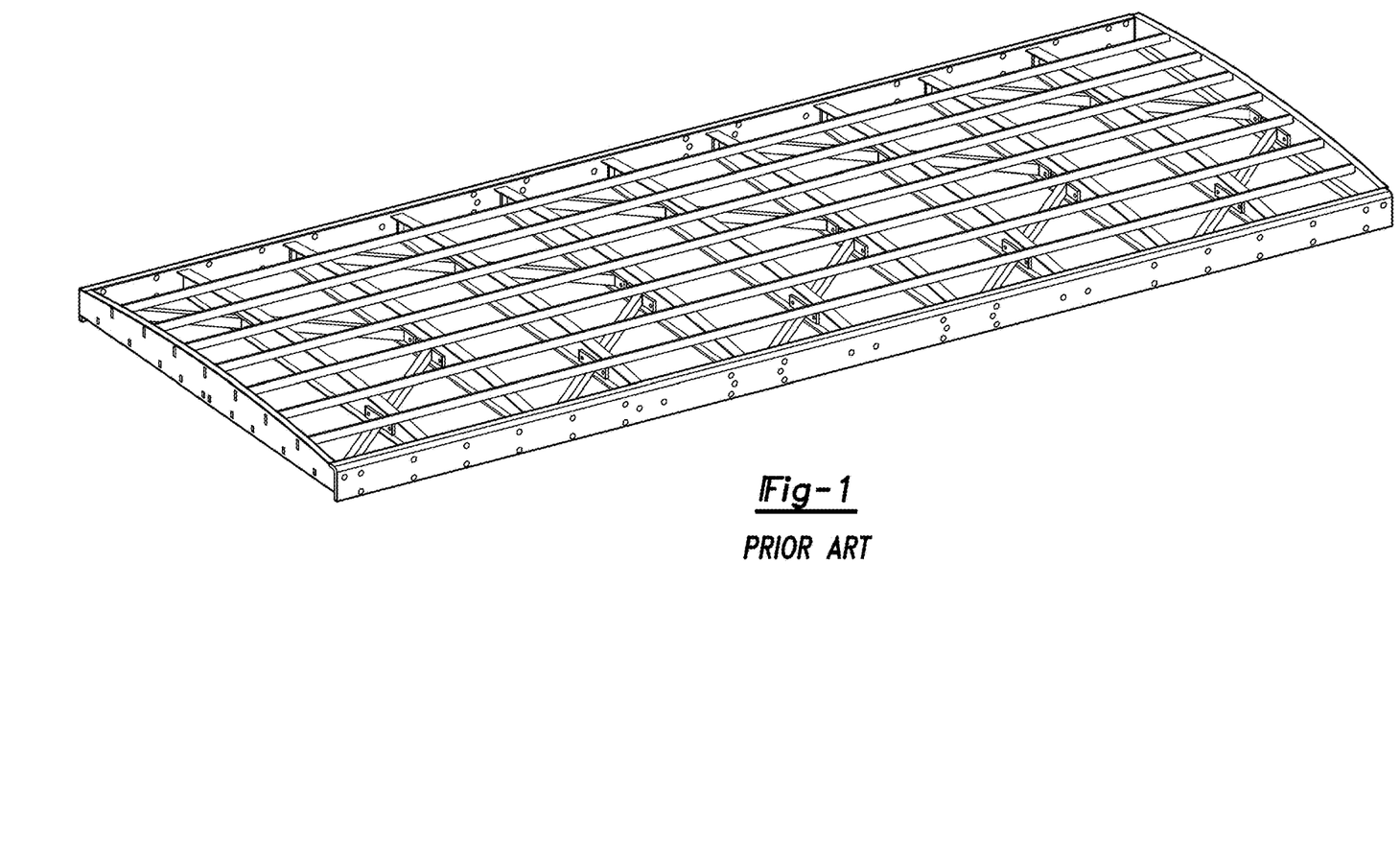
FIG. 1 is a diagram illustrating a vibrating screening deck of the prior art, which utilizes a fully tapered cross-member and a plurality of identical stringers.

Now referring to the drawings, wherein like numerals refer to like matter throughout, and more particularly FIG. 1, there is shown a diagram illustrating a simplified version of a rectangular screen deck of the prior art, generally designated 10 having a perimeter of four sides 11, and a plurality of tapered I-beams 12. For the most part, these screens achieve a crowned screen cloth with a fully tapered I-beam cross-member 12 with identical stringers 13.

Figure 2:
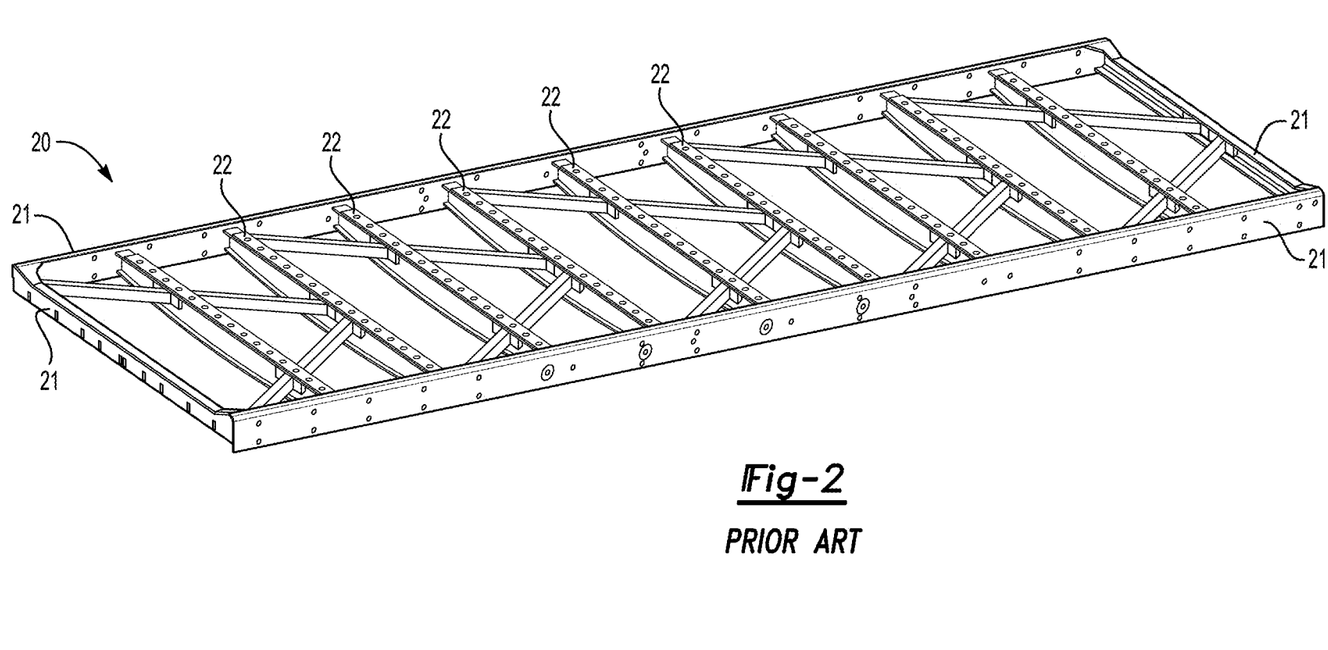
FIG. 2 is a simplified diagram of a flat screen deck of the prior art.

Now referring to FIG. 2, the rectangular screen deck, generally designated 20, is shown as having a perimeter of four sides 21, with flat top cross-members 22 spanning across the deck to make a flat surface for the screen cloth which is representative of different support systems used to support different types of screen cloths of the prior art.

Figure 3:
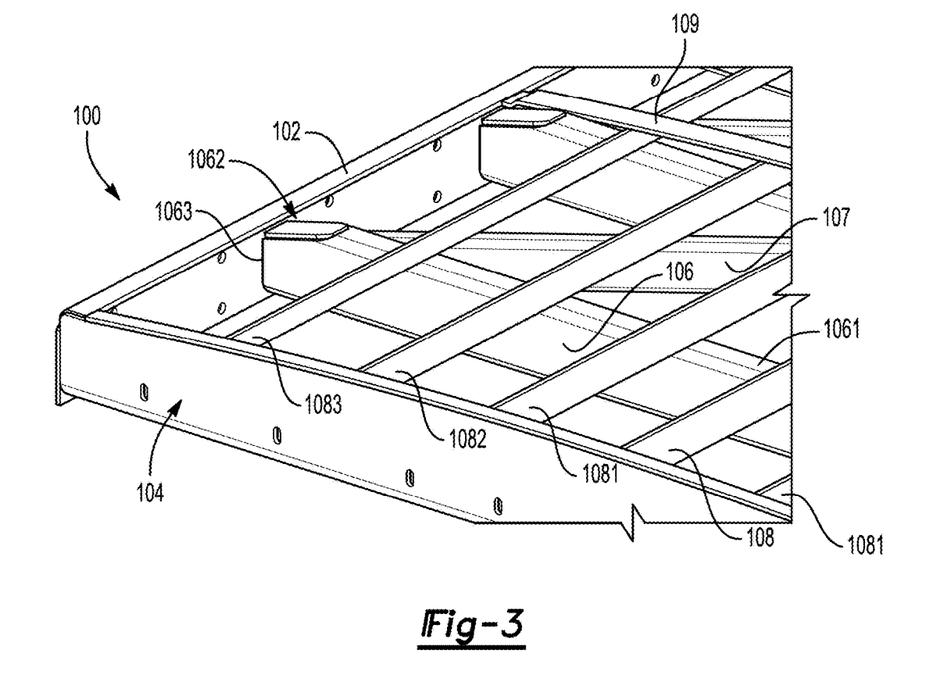
FIG. 3 is a simplified diagram of a corner portion of a screen deck of the present invention.

Now referring to FIG. 3, there is shown a simplified representation of a corner portion of a crowned rectangular screen deck of a vibrating screening machine of the present invention generally designated 100, which is formed by deck sides 102 and deck ends 104 and supported by supports 107. The screen deck 100 includes a plurality of unique and novel coped tubular cross-members 106 spanned by a plurality of substantially equally spaced apart longitudinal stringers 108, 1081, 1082, 1083 with different height characteristics to support the screen media, represented here by a tiny portion 109, in a typical crowned configuration 108 (highest), 1081 (high), 1082 (medium), and 1083 (low). It combines the benefits of the short side plates (similar to that of the I-beam cross-member) with the simple and inexpensive tube design cross-member.

The ends of the tube cross-members 106 are coped and then capped to form sloped end portions 1062. This allows for the tube 106 to have a central flat portion 1061, which is tall and strong in the center of the deck for wide decks, but is angle cut short to form sloped end portions 1062. Cross-member 106 has a non-sloped side which opposes and is parallel to central flat portion 1061. Since the capped tube keeps its rectangular shape, the non-angled end surfaces 1063 are easily welded to deck sides 102, without starts and stops, eliminating stress concentrations. Like the tapered I-beam design of the prior art, it can be used with either side tension style decks or with urethane media style decks, depending on how the cross-member tube 106 is oriented. (See FIGS. 5 and 6 for flat urethane media style decks.) As the cross-member 106 is a simple angled end cut tube cut to length, it is more cost effective than the tapered I-beam.

Figure 4:
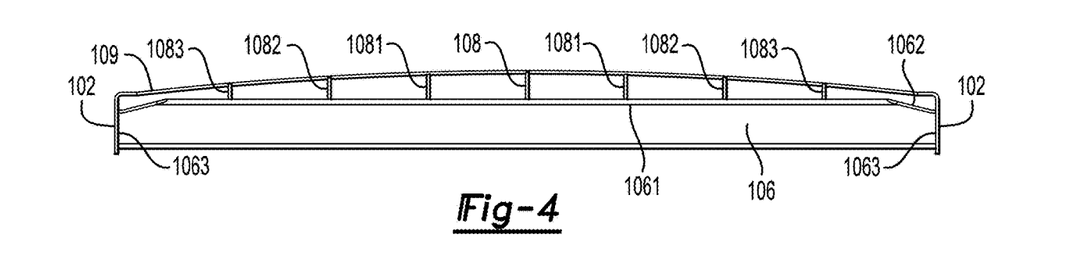
FIG. 4 is a side view of a screen deck of FIG. 3.

Now referring to FIG. 4, there is shown a side view representation of the present invention of FIG. 3.

Figure 5:
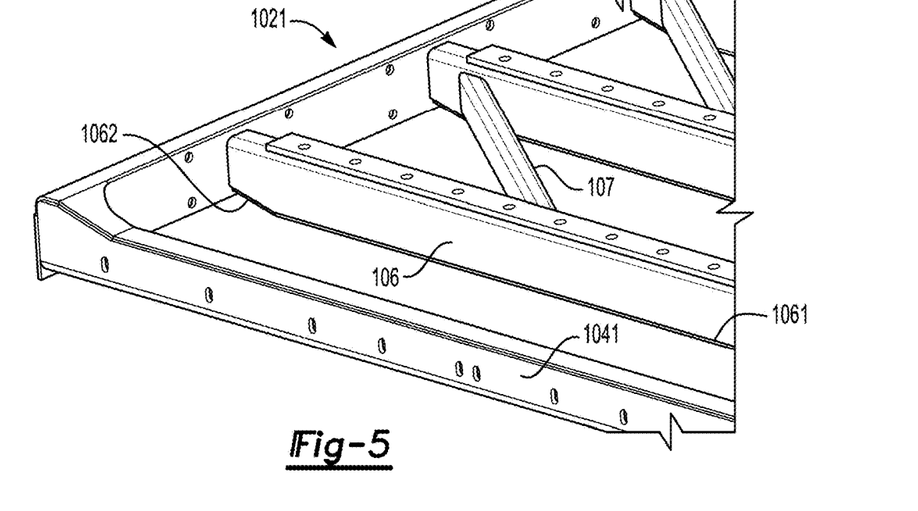
FIG. 5 is a view of an alternate embodiment of the present invention for a flat screen deck using the same tapered cross-members as shown in FIGS. 3 and 4.

Now referring to FIG. 5, there is shown a system of the present invention which is a close up view of a corner view of a flat screen deck of the present invention which utilizes an inverted tapered cross-member 106 of FIGS. 3 and 4. Deck sides 1021 are similar to deck sides 102 of FIGS. 3 and 4. Deck ends 1041 are similar to deck ends 104.

Figure 6:
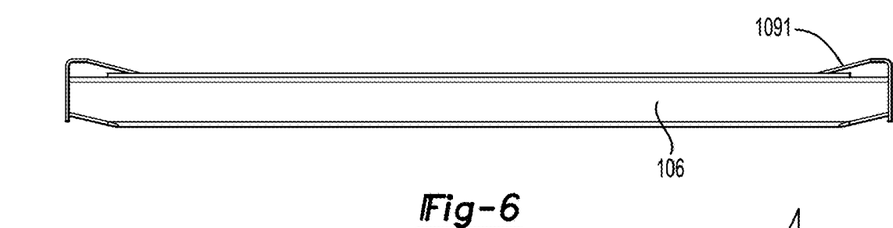
FIG. 6 is a side view of the screen deck of FIG. 5.

Now referring to FIG. 6, there is shown a side view of the screen deck of FIG. 5.

Figure 7:
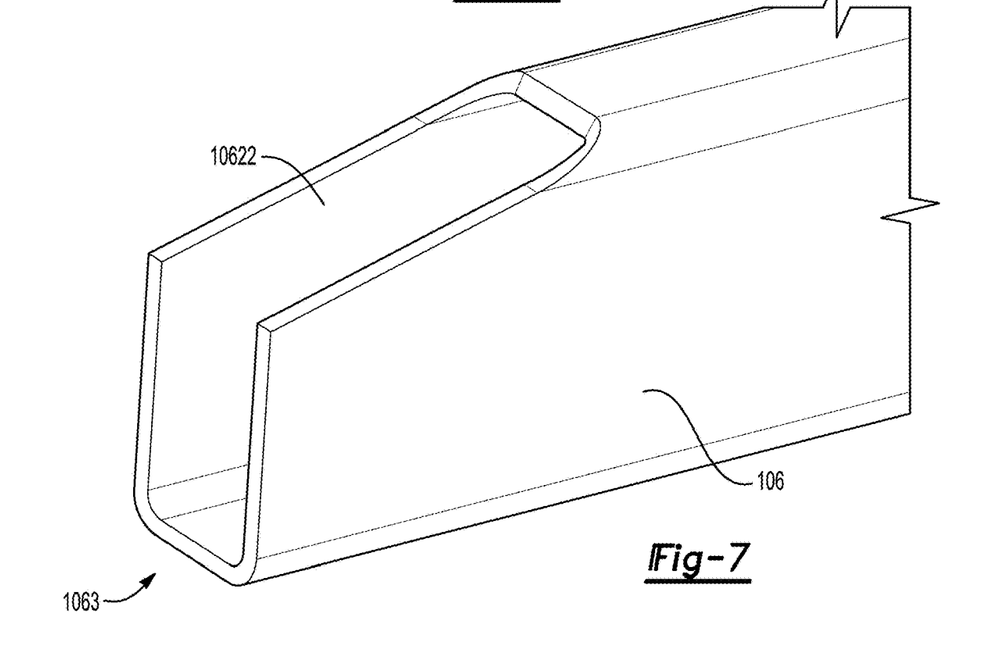
FIG. 7 is a close up view of an end of a coped tube 106 without a cap plate.
Figure 8:
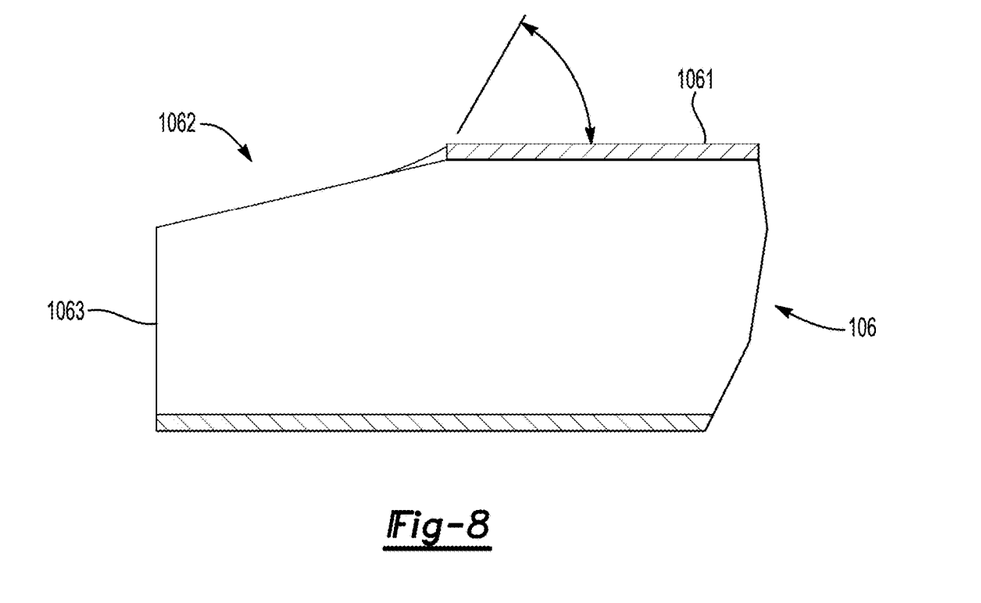
FIG. 8 is a detailed side view of the coped tube of FIG. 7 with angular details of the beveled edge.
Figure 9:
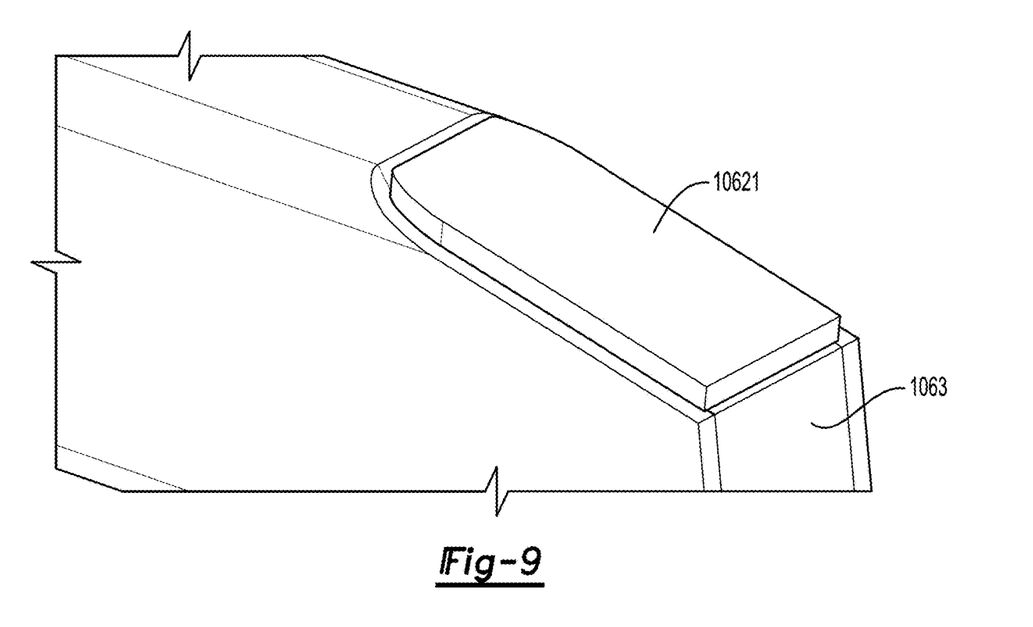
FIG. 9 is a close up view of the coped tube 106 of FIG. 7 having a cap plate.

Now referring to FIGS. 7-9, attention is directed to the ends 1062. Normally, coping a tube to produce sloped-end portions would result in irregular and multiple cuts creating stress risers. Even after a cap is welded on a coped end, these stress risers could normally remain.

One embodiment of the present invention adds further detail to the screen deck with cross-member tube from FIGS. 3-6 in that it is coped by using a smooth continuous cut, which may be done with a five axis laser cutter. The coped tube end can then be caped with a plate 10621 that is welded on with a continuous or robotic weld without adding stress risers. The process creates the sloped end portions 1062 of the present invention. The continuous weld connection between the non-angled end surfaces 1063 and the deck side 102 makes for easier manufacturing and improved product life. The continuous sweeping cut 10622 eliminates the stress risers that lead to high cycle fatigue failure.

During the cutting process, the cutting head angle changes as it cuts through the radius of the tube. This leaves newly exposed surfaces with a continuous edge profile without any sharp changes in the tube cross-section. As the top surface of the tube is cut, the cutting head is, in one embodiment, held at 30 degrees off vertical, leaving an optimal weld bevel for the cap plate 10621. The cap plate 10621 profile can be cut using conventional CNC methods. In some embodiments, the cap plate 10621 is welded to the coped tube end forming sloped end portions 1062 without any further weld prep.

The tube cross-member 106 is strong enough to support screen media 109 and its unique end profile allows for minimal deck side height. Minimal deck height is desired in order to achieve the most compact screen, making it easier to transport. The coped and capped tube becomes a common cross-member 106 that is used on both the side-tensioned crowned and flat screen decks. Depending on the deck, the cross-member 106 is simply rotated 180 degrees during the assembly process.

The precise implementation of the present invention will vary depending upon the particular application.

Figure 10:
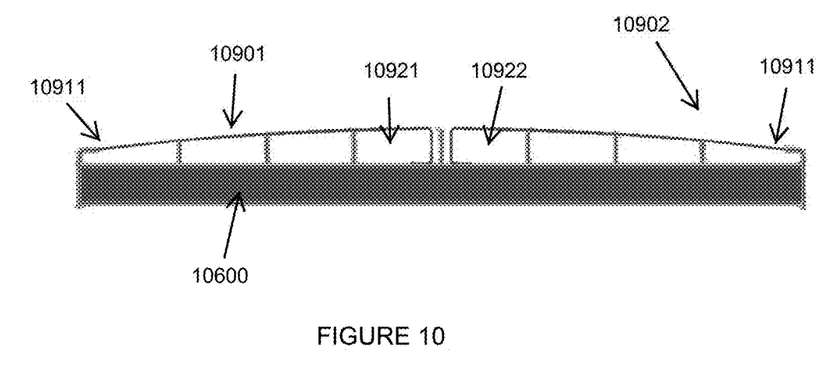
FIG. 10 is a side view of a screen deck of the present invention with a pair of Single C crown straps.

Now referring to FIG. 10, there is shown a side view of a cross-member 10600 with a two-piece crown strap 1091 and 10902 with one end 10911 coupled to one of a plurality of longitudinal side members and the other end being a bent C-shaped end 10921 or 10922 which sits on top of and is welded to a cross-member 10600.

Figure 11:
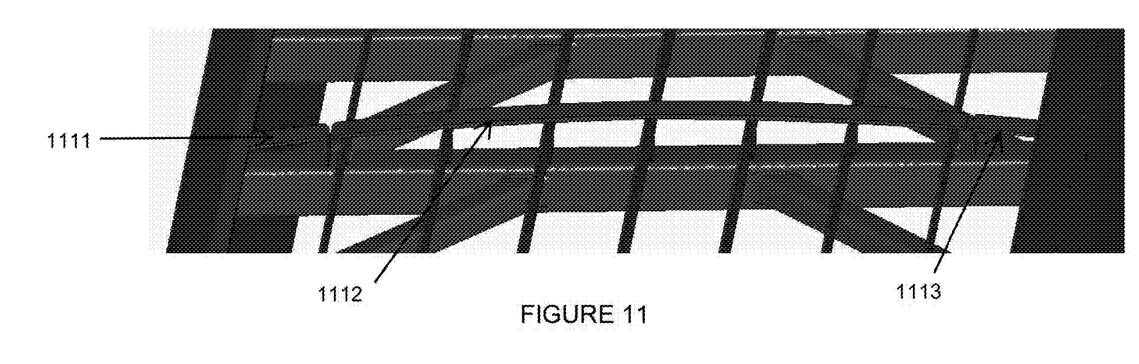
FIG. 11 is a perspective view of a three-piece crown strap design of the present invention, with two bent members and one rolled central member.

Now referring to FIG. 11, there is shown a perspective view of a three-piece crown strap design of the present invention, with two bent members 1111 and 1113 and one rolled central member 1112.

Figure 12:
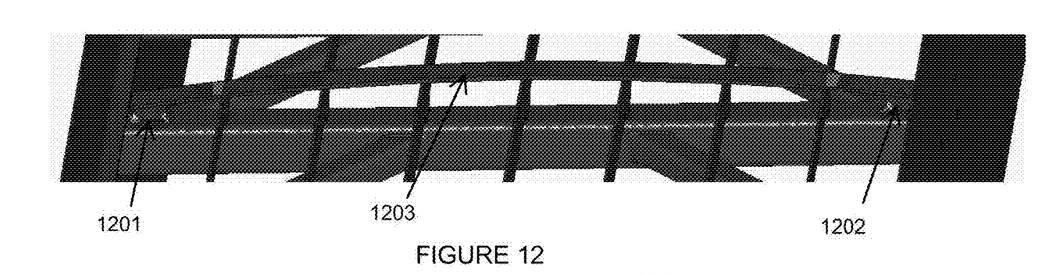
FIG. 12 is a perspective view of a three-piece crown strap design of the present invention, with two gussets and one rolled central member.

Now referring to FIG. 12, there is shown a perspective view of a three-piece crown strap design of the present invention, with two gussets 1201 and 1202 and one rolled central member 1203.

Figure 13:
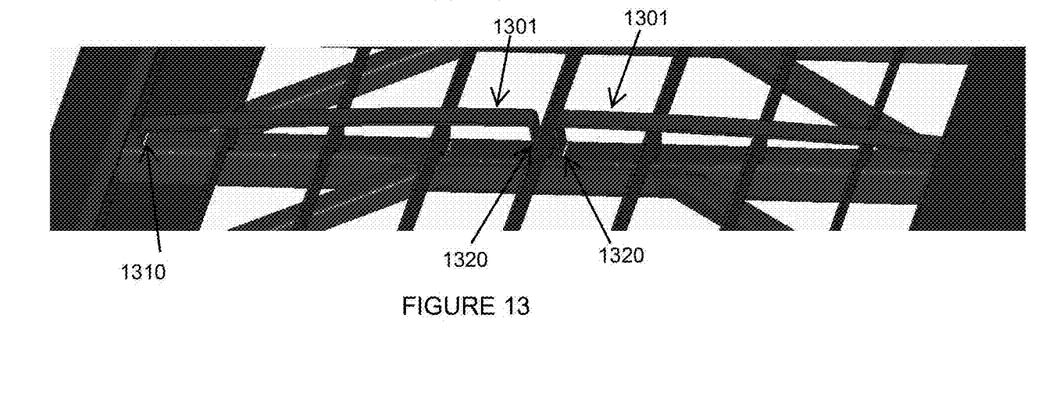
FIG. 13 is a perspective view of a two-piece crown strap design of the present invention, with each piece having two bent ends for welding to a cross-member.

Now referring to FIG. 13, there is shown a perspective view of a two-piece crown strap design of the present invention, with each piece 1301 having two bent ends an outer end 1310 and a central end 1320 configured to sit on and for welding to a cross-member.

Figure 14:
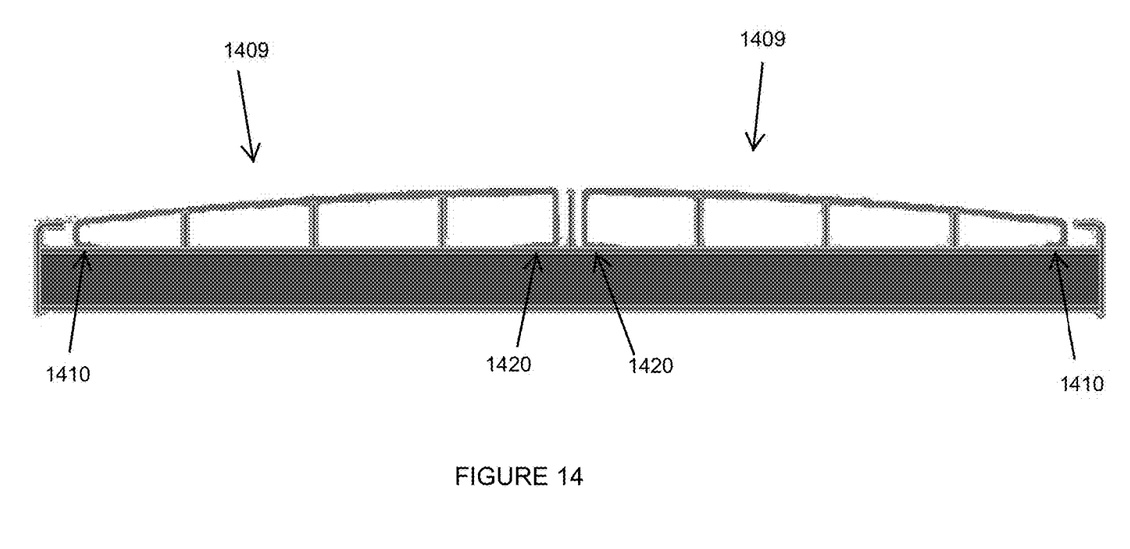
FIG. 14 is a side view of a two-piece crown strap design of the present invention, with two bent pieces each with two C-shaped ends.

Now referring to FIG. 14, there is shown a side view of a two-piece crown strap design of the present invention, with two bent pieces 1409 each with an outer C-shaped end 1410 and an inner C-shaped end 1420. Where the ends 1410 and 1420 are configured to sit upon and be welded to a top surface of a cross-member.

Figure 15:
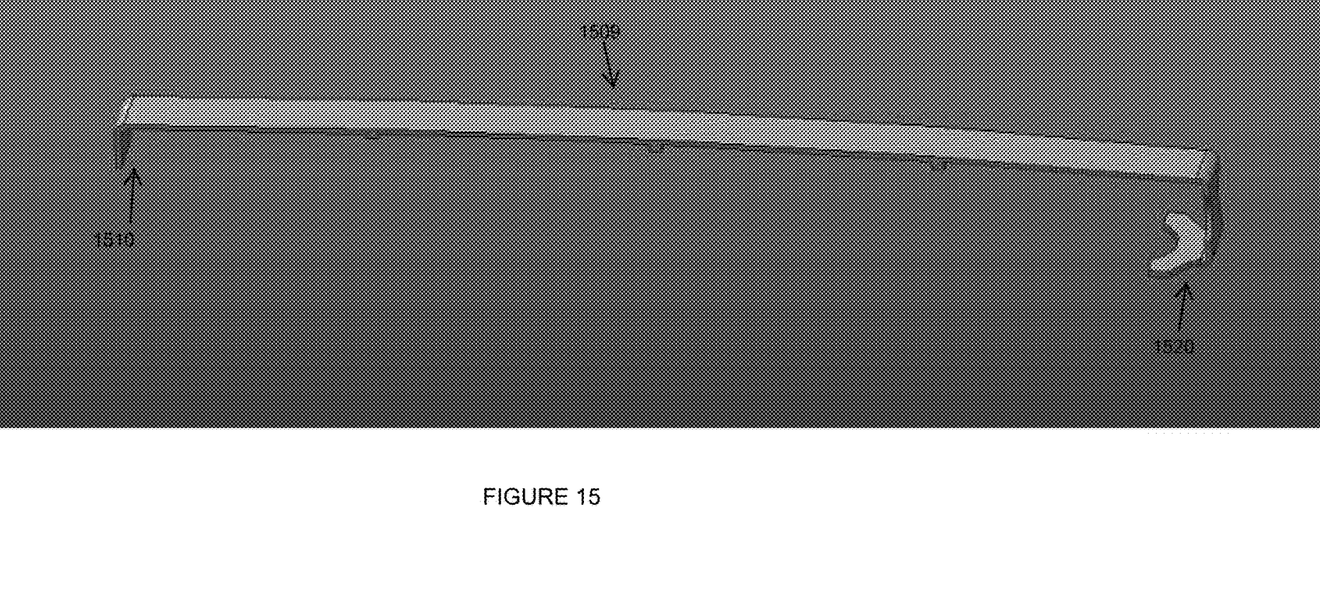
FIG. 15 is a perspective view of one piece of a two-piece crown strap design of the present invention with one L-shaped end and modified C-shaped end.

Now referring to FIG. 15, there is shown a perspective view of one piece 1509 of a two-piece crown strap design of the present invention with one outer L-shaped end 1510 and an inner modified C-shaped end 1520.

Figure 16:
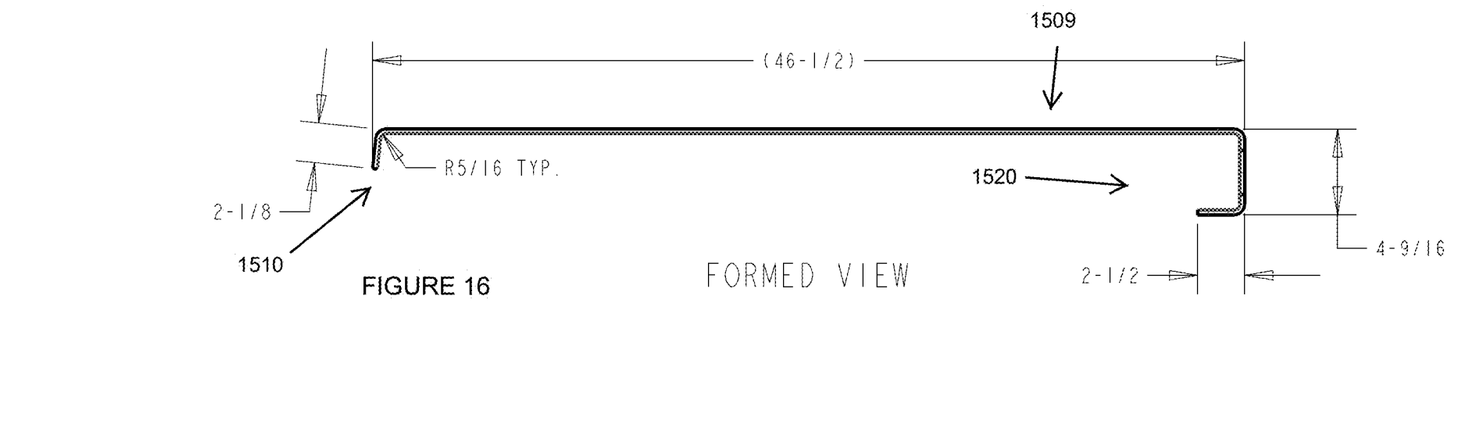
FIG. 16 is a side view of the piece shown in FIG. 15.

FIG. 16 is a side view of the piece shown in FIG. 15.

Figure 17:
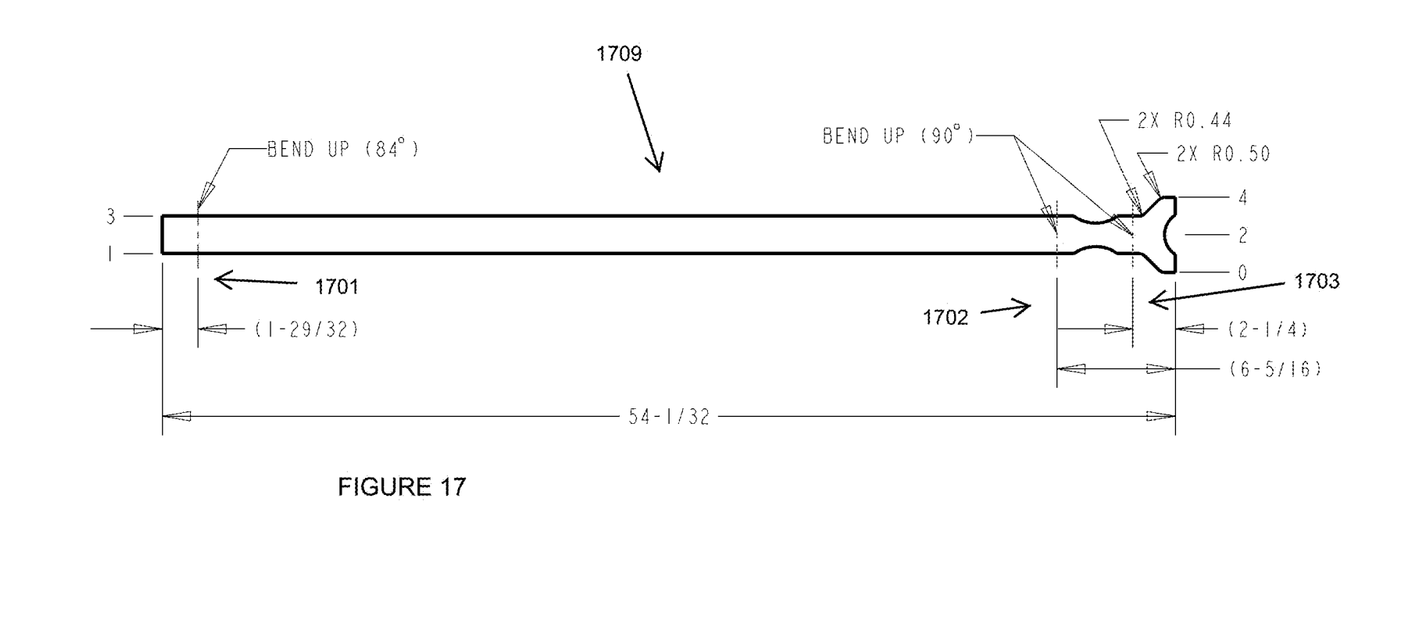
FIG. 17 is a top view of the piece shown in FIGS. 15 and 16.

FIG. 17 is a top view of an interim flat configuration 1709 of the piece 1509 shown in FIGS. 15 and 16, but before it is bent along lines 1701, 1702 and 1703.

Figure 18:
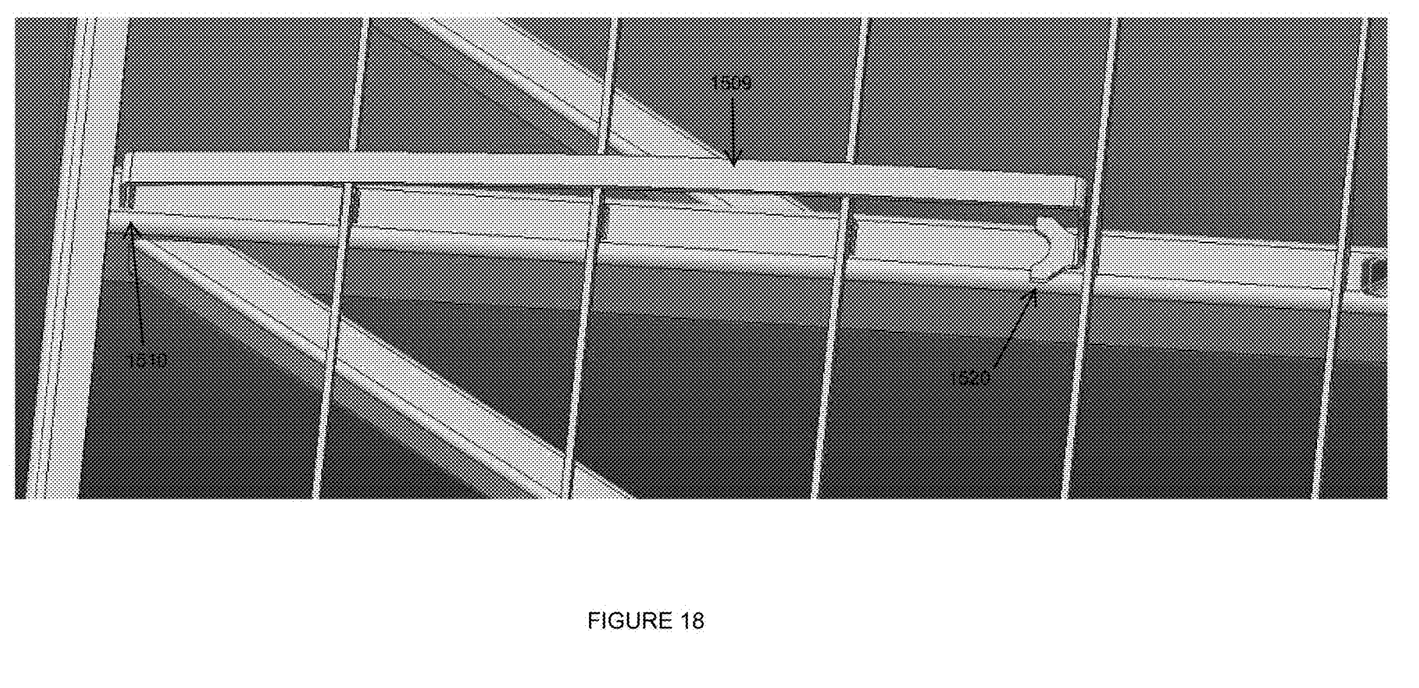
FIG. 18 is a perspective view of the piece shown in FIGS. 15-17, disposed on portions of a deck of vibrating screening machine.

FIG. 18 is a perspective view of the piece 1509 shown in FIGS. 15-16, disposed on portions of a cross-member of a deck of a vibrating screening machine.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

We claim:

1. A vibrating screen system comprising:
a pair of spaced apart parallel longitudinal side members;
a plurality of cross-members having opposing ends, each of which are coupled to one of said pair of spaced apart parallel longitudinal side members;
where each of said plurality of cross-members include sloped end portions;
a screen media secured above said plurality of cross-members, which screen media is configured to only allow particles having smaller size than a predetermined size to pass therethrough;
a cap plate which is disposed on said sloped end portions; and
a plurality of spaced apart stringers which are made with different vertical height characteristics so as to provide support for said screen media in a crowned configuration.

2. The vibrating screen system of claim 1 wherein said different vertical height characteristics are arranged on a central flat portion so that smaller ones of said different vertical height characteristics are proximal to said sloped end portions.

3. The vibrating system of claim 2 further comprising a plurality of crown straps each disposed above and in registration with one of said plurality of cross-members.

4. The vibrating system of claim 3 wherein each of said plurality of crown straps is coupled to a top surface of one of said plurality of cross-members.

5. The vibrating system of claim 4 wherein each of said plurality of crown straps has a C-shaped end which is welded to a top surface of one of said plurality of cross-members.

6. The vibrating system of claim 5 wherein each of said plurality of crown straps has two C-shaped ends each of which is welded to a top surface of one of said plurality of cross-members.

7. A vibrating screen system comprising:
a pair of spaced apart parallel longitudinal side members;
a plurality of cross-members having opposing ends, each of which are coupled to one of said pair of spaced apart parallel longitudinal side members; and
a plurality of crown straps each disposed above and in registration with one of said plurality of cross-members.

8. The vibrating system of claim 7 wherein each of said plurality of crown straps is coupled to a top surface of one of said plurality of cross-members.

9. The vibrating system of claim 8 wherein each of said plurality of crown straps has a C-shaped end which is welded to a top surface of one of said plurality of cross-members.

10. The vibrating system of claim 9 wherein each of said plurality of crown straps has two C-shaped ends, each of which is welded to a top surface of one of said plurality of cross-members.

11. The vibrating system of claim 10 further comprising:
a screen media secured above said plurality of cross-members, which screen media is configured to only allow particles having smaller size than a predetermined size to pass therethrough; and
wherein each of said plurality of cross-members comprises a central flat portion.

12. The vibrating system of claim 11 further comprising:
a plurality of spaced apart stringers disposed on said central flat portion;
wherein said plurality of spaced apart stringers are made with different vertical height characteristics so as to provide support for said screen media in a crowned configuration; and
wherein said different vertical height characteristics are arranged on said central flat portion so that smaller ones of said different vertical height characteristics are proximal to outside end portions of said plurality of cross-members.

13. A vibrating screen system comprising:
a pair of spaced apart parallel longitudinal side members;
a plurality of cross-members having opposing ends, each of which are coupled to one of said pair of spaced apart parallel longitudinal side members;
a screen media secured above said plurality of cross-members, which screen media is configured to only allow particles having smaller size than a predetermined size to pass therethrough; and
a plurality of spaced apart stringers which are made with different vertical height characteristics so as to provide support for said screen media in a crowned configuration.

14. The vibrating screen system of claim 13 wherein said different vertical height characteristics are arranged on a central flat portion.

15. The vibrating system of claim 14 further comprising a plurality of crown straps each disposed above and in registration with one of said plurality of cross-members.

16. The vibrating system of claim 15 wherein each of said plurality of crown straps is coupled to a top surface of one of said plurality of cross-members.

17. The vibrating system of claim 16 wherein each of said plurality of crown straps has a C-shaped end which is welded to a top surface of one of said plurality of cross-members.

18. The vibrating system of claim 17 wherein each of said plurality of crown straps has two C-shaped ends each of which is welded to a top surface of one of said plurality of cross-members.

* * * * *